Aug. 18, 1942.  S. G. SMITH  2,293,409
COMBINED ACCELERATOR PEDAL AND SWITCH
Filed Dec. 31, 1940    2 Sheets-Sheet 1

Inventor
Samuel G. Smith
By Clarence A. O'Brien
Attorney

Aug. 18, 1942.  S. G. SMITH  2,293,409
COMBINED ACCELERATOR PEDAL AND SWITCH
Filed Dec. 31, 1940  2 Sheets-Sheet 2
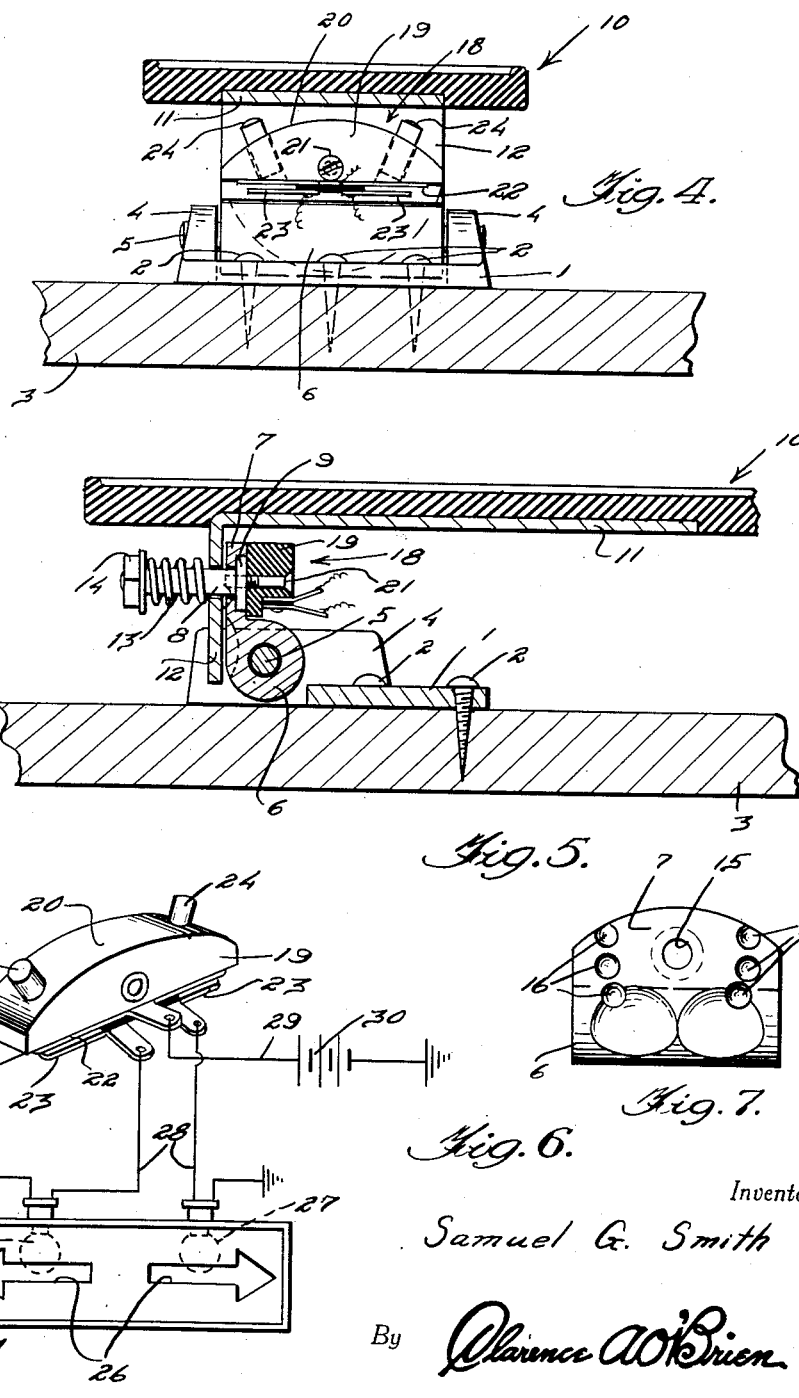
Inventor
Samuel G. Smith
By Clarence A. O'Brien
Attorney Patented Aug. 18, 1942

2,293,409

UNITED STATES PATENT OFFICE 2,293,409

COMBINED ACCELERATOR PEDAL AND SWITCH

Samuel G. Smith, Manchester, Conn.

Application December 31, 1940, Serial No. 372,648

5 Claims. (Cl. 200—59)

The present invention relates to new and useful improvements in combined accelerator pedals and switches for motor vehicles and has for its primary object to provide, in a manner as hereinafter set forth, a device of this character whereby both the engine throttle valve and a direction signal on the vehicle may be conveniently controlled with one foot, thus permitting the hands to remain on the steering wheel.

Another very important object of the invention is to provide a combination pedal of the aforementioned character which may remain in either circuit closing position and at the same time control the vehicle engine.

Other objects of the invention are to provide a combined accelerator pedal and signal control switch of the character described which will be comparatively simple in construction, strong, durable, highly efficient and reliable in use, compact and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 4 is a cross sectional view, taken substantially on the line 4—4 of Figure 1.

Figure 5 is a view in vertical longitudinal section, the forward portion of the pedal member being broken away.

Figure 6 is a diagrammatic view of the electric circuit.

Figure 7 is a detail view in rear elevation of the hinge member.

Figure 1:
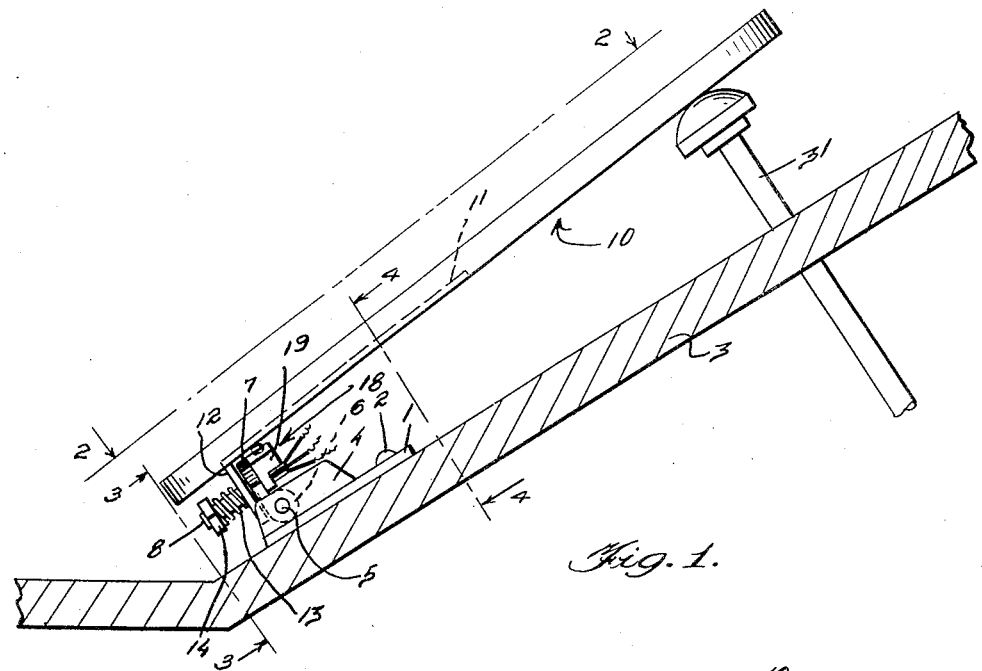
Figure 1 is a view in side elevation of a combined accelerator pedal and signal control switch constructed in accordance with the present invention, showing the floor of the vehicle in vertical section.
Figure 2:
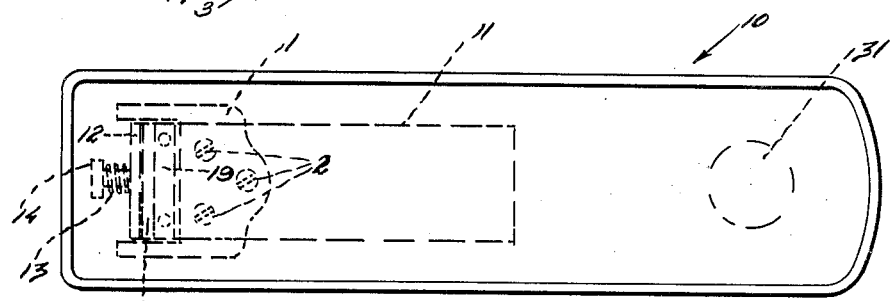
Figure 2 is a plan view, looking at the device substantially from the line 2—2 in Figure 1.

Referring now to the drawings in detail, it will be seen that the embodiment of the invention which has been illustrated comprises a bracket 1 of suitable metal which is firmly secured, as at 2, in the desired position on the floor 3 of the vehicle. The floor bracket 1 includes integral ears 4 between which a shaft or pin 5 extends.

Journaled on the pin 5 is a hinge 6 which includes a leaf or plate 7. Mounted on the plate 7 and extending rearwardly therefrom is a pedal member coupling bolt 8 the head 9 of which, it will be noted, is countersunk in said plate 7.

The reference numeral 10 designates a pedal member having secured in any suitable manner to its lower rear portion a metallic plate 11. The plate 11 is elongated and terminates in a right angularly extending, apertured rear end portion constituting a flange or ear 12 which is slidably and rotatably mounted on the bolt 8. A coil spring 13 on the bolt 8 yieldingly urges the ear 12 against the hinge plate or leaf 7. A nut 14 is threaded on the rear end portion of the bolt 8 for permitting the tension of the spring 13 to be regulated as desired.

Figure 8:
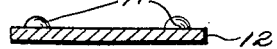
Figure 8 is a detail view in horizontal section through the pedal ear or flange.

The opening or aperture in the ear 12 which accommodates the bolt 8 is indicated at 15. As illustrated to advantage in Figure 7 of the drawings, the rear face of the hinge plate or leaf 7 has formed therein arcuate series of rounded sockets or depressions 16 which are concentric with the opening 15. Mounted on the front of the ear 12 are rounded projections or detents 17 (see Fig. 8) which are engageable in the sockets 16 for releasably securing the pedal member 10 in either of its signalling positions or in neutral position. It may be well to here state that the coil spring 13 engages the detents 17 in the sockets 16 and permits said detents to ride out of said sockets.

Mounted on the front of the hinge plate or leaf 7 is a switch which is designated generally by the reference numeral 18. The switch 18 includes a block 19 of suitable insulating material, said block being of angular cross section and including a curved or rounded top 20. A countersunk screw 21 secures the insulating block 19 to the hinge leaf or plate 7, said screw 21 being threaded into the headed end portion of the bolt 8.

Mounted on the lower side of the block 19 is a resilient contact strip 22 of suitable conducting material. The intermediate portion only of the resilient contact strip 22 is secured to the block 19, the end portions thereof being free to be bent away from said block. Mounted beneath the contact strip 22 and spaced therefrom but engageable thereby are insulated, oppositely extending contact fingers 23. Radial buttons 24 are slidably mounted in the end portions of the insulating block 19 and project from the curved top 20 thereof for engagement and actuation by the plate 11 on the pedal member 10. The slidable buttons 24 are engaged with the end portions of the contact strip 22 for engaging same with the fingers 23.

In Figure 6 of the drawings, the reference numeral 25 designates generally a vehicle direction signal comprising indicating arrows 26 which are adapted to be illuminated by electric lamps 27. Conductors 28 electrically connect the contact fingers 23 to the lamps 27. The contact strip 22 is connected at 29 to a storage battery 30. If desired, a telltale light on the instrument board of the vehicle may be interposed in the electric circuit for showing if the lamps 27 are functioning.

Figure 3:
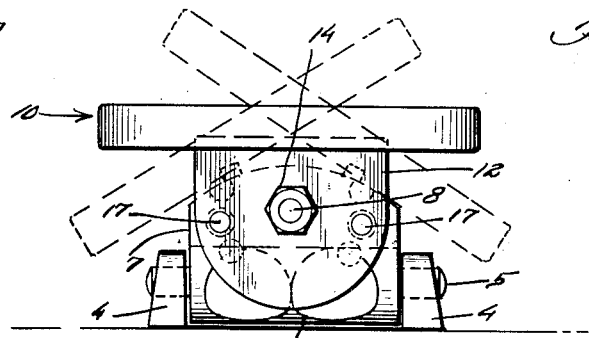
Figure 3 is a view in rear elevation, looking at the device from line 3—3 in Figure 1.

It is thought that the operation of the device will be readily apparent from a consideration of the foregoing. Briefly, the pedal member 10 with the rest of the assembly is adapted to swing in a vertical plane on the floor bracket 1 for operating the engine throttle valve in the usual manner. In Figure 1 of the drawings, the reference numeral 31 designates a conventional operating rod from the throttle valve which is engaged beneath the free forward end portion of the pedal member 10 for actuation thereby. When the pedal member 10 is in intermediate or neutral position the detents 17 are engaged in the intermediate sockets 16 and the electric circuits to the signal lamps 27 are open. To energize either of the lamps 27 the pedal member 10 is simply rocked laterally in the desired direction on the bolt 8. Thus, either of the buttons 24 is depressed by the plate 11 for energizing one of the lamps 27 thereby illuminating the desired direction indicating arrow 26. The detents 17 engage in the end sockets 16 for releasably securing the device in either of its circuit closing positions. Of course, when the free end portions of the contact strip 22 are bent downwardly by the slidable buttons 24 they are engaged with the fingers 23. The operator is unlikely to leave either of the signals on unintentionally while driving as his foot will be in an unnatural position when the pedal member 10 is rocked to either signalling position substantially as suggested in broken lines in Figure 3 of the drawings.

It is believed that the many advantages of a combined accelerator pedal and switch constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:

1. In combination, a pedal member pivoted on longitudinal and transverse axes for bodily movement of the entire area of the pedal, and a control switch engageable and operable to closed position by said pedal member when it is turned on its longitudinal axes.

2. A combined accelerator pedal and switch including a support, a hinge member journaled on said support for front and rear swinging movement, a pedal member journaled on said hinge member for lateral rocking movement of the pedal on an axis at right angles with respect to the axis of the hinge member, and an electric switch mounted on the hinge member and operable to closed position by the pedal member upon rocking movement thereof.

3. A combined accelerator pedal and switch comprising a support, a hinge member pivotally mounted on said support, a bolt mounted on the hinge member at right angles to the axis of the hinge member, a pedal member slidable longitudinally and rockably mounted on said bolt, an electric switch mounted on the hinge member and operable to closed position by the pedal member upon rocking movement thereof, and means for releasably securing the pedal member in adjusted position on the hinge member.

4. A combined accelerator pedal and switch comprising a floor bracket, a hinge member journaled on said floor bracket, said hinge member having a plurality of sockets therein, a bolt mounted on the hinge member at right angles to the axis of the hinge member, a pedal member, an ear projecting from said pedal member and slidably and rockably mounted on the bolt, a switch on the hinge member operable to closed position by the pedal member upon rocking movement thereof, a spring on the bolt engaged with the ear for yieldingly urging same toward the hinge member, and detents on said ear engageable in the sockets for releasably securing the pedal member in adjusted position on the hinge member.

5. A combined accelerator pedal and switch comprising a support, a hinge member journaled on the support, a pedal member rockably mounted on said hinge member on an axis at right angles to the axis of the hinge member, and a switch mounted on the hinge member, said switch including an insulating element, electric contacts mounted on said element, and buttons slidably mounted in the element for closing the contacts, said buttons being operable by the pedal member upon rocking movement thereof.

SAMUEL G. SMITH.